United States Patent [19]

Chen et al.

[11] Patent Number: 4,872,995

[45] Date of Patent: Oct. 10, 1989

[54] METHOD FOR CALCIUM OXALATE SCALE CONTROL

[75] Inventors: Fu Chen, Newtown, Pa.; Daniel L. Michalopoulos, Jacksonville, Fla.

[73] Assignee: Betz Laboratories, Inc., Trevose, Pa.

[21] Appl. No.: 203,035

[22] Filed: Jun. 6, 1988

Related U.S. Application Data

[63] Continuation-in-part of Ser. No. 37,484, Apr. 13, 1987, Pat. No. 4,759,851, which is a continuation of Ser. No. 864,049, May 16, 1986, Pat. No. 4,659,481, which is a continuation of Ser. No. 545,563, Oct. 26, 1983, abandoned.

[51] Int. Cl.$^4$ .............................................. C02F 5/14
[52] U.S. Cl. ................................... 210/699; 162/48; 162/72; 162/73; 162/199; 210/701; 252/180
[58] Field of Search ............... 162/DIG. 5, 48, 72, 162/73, 199; 210/698–701; 252/180, 181

[56] References Cited

U.S. PATENT DOCUMENTS

| | | | |
|---|---|---|---|
| 4,029,577 | 6/1977 | Godlewski et al. | 252/180 |
| 4,303,568 | 12/1981 | May et al. | 252/181 |
| 4,324,684 | 4/1982 | Geiger et al. | 252/181 |
| 4,469,615 | 9/1984 | Tsuruoka et al. | 252/180 |
| 4,500,693 | 2/1985 | Takehara et al. | 526/240 |
| 4,532,048 | 7/1985 | Amjad et al. | 210/701 |
| 4,560,481 | 12/1985 | Hollander | 210/697 |
| 4,575,425 | 3/1986 | Boffardi et al. | 210/697 |
| 4,640,793 | 2/1987 | Persinski et al. | 210/698 |
| 4,659,480 | 4/1987 | Chen et al. | 210/697 |
| 4,659,481 | 4/1987 | Chen | 210/697 |
| 4,659,482 | 4/1987 | Chen | 210/699 |
| 4,671,880 | 6/1987 | Wisener et al. | 210/699 |
| 4,701,262 | 10/1987 | Chen | 210/699 |
| 4,708,815 | 11/1987 | Chen et al. | 252/181 |

FOREIGN PATENT DOCUMENTS

| | | |
|---|---|---|
| 0142929 | 5/1985 | European Pat. Off. . |
| 2522637 | 12/1976 | Fed. Rep. of Germany . |
| 155692 | 12/1981 | Japan . |

OTHER PUBLICATIONS

Chem Abstracts 98:203736r, "Additives for Dust Scrubbing Liquor".
Chem Abstracts 99:58708X, "Scale Inhibitors for Cooling Water System".

*Primary Examiner*—Peter Hruskoci
*Attorney, Agent, or Firm*—Bruce E. Peacock; Alexander D. Ricci

[57] ABSTRACT

Methods of controlling the formation of calcium oxalate in aqueous systems are disclosed. The methods comprise adding from about 0.1 to 500 ppm of a water soluble (meth)acrylic acid/allyl ether copolymer to the desired water system. The methods are especially well adapted for use in pulping and paper making systems wherein calcium oxalate is often encountered as a troublesome scale forming compound.

12 Claims, No Drawings

METHOD FOR CALCIUM OXALATE SCALE CONTROL

CROSS-REFERENCE TO RELATED APPLICATIONS

This is a continuation-in-part of application Ser. No. 037,484 filed April 13, 1987, now U.S. Pat. No. 4,759,851, which is a continuation of Serial No. 864,049 filed May 16, 1986 (not U.S. Pat. No. 4,659,481), which in turn is a continuation of Serial No. 545,563 filed October 26, 1983 (not abandoned).

FIELD OF THE INVENTION

The present invention pertains to a method of controlling calcium oxalate scale formation in an aqueous system by using certain copolymers of (meth)acrylic acid and allyl ether based monomers.

BACKGROUND OF THE INVENTION

In the papermaking process, calcium oxalate scale often forms on process equipment during the bleaching-/delignification of pulp by chlorine, caustic soda, chlorine dioxide, hypochlorite and peroxide. Usual areas of scale build-up are on washer drum face wires; in washer vats; in stock lines and pumps; in filtrate tanks, lines, and pumps; on extraction screens; and in treatment towers. The formation of calcium oxalate scale provides an economic hardship on mills principally because of lost production due to decreased bleaching/delignification efficiency and equipment downtime associated with the removal of scale.

One option available to pulp mills to attempt to prevent this scale build-up has been the use of continuously fed scale control agents. Historically, these additives have included polyphosphates, organic phosphonic acid, lignosulfonates, and various water soluble polycarboxylates. However, recent industrial trends to recycle water in order to reduce bleach plant effluent volumes for environmental reasons and the use of calcium carbonate laden paper machine white water as bleach plant process water are expected to increase the frequency and severity of calcium oxalate scale formation. Moreover, increases in bleach plant hardness and oxalate levels associated with these trends have caused some of the conventional scale control agents to fail because of their inability to function under conditions which promote extensive scale formation, namely high levels of calcium and oxalate.

It is thus one object of this invention to provide a method for the control of calcium oxalate scale in paper process system. It is a further object of this invention to provide a method which adequately controls the formation of calcium oxalate scale even in aqueous systems having high calcium and oxalage levels.

SUMMARY OF THE INVENTION

We have found that calcium oxalate scale may be adequately controlled by adding to the desired aqueous system, such as a pulp and papermaking aqueous system, from about 0.5 to about 500 ppm of a water soluble (meth)acrylic acid/allyl ether copolymer, based on one million parts of the aqueous system.

The (meth)acrylic acid/allyl ether copolymers, useful in accordance with the invention, have the structure

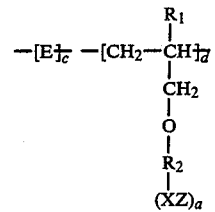

wherein E is the repeat unit remaining after polymerization of an $\alpha$, $\beta$, ethylenically unsaturated compound, $R_1$, is H or lower ($C_1$-$C_4$) allkyl, $R_2$ is $(CH_2-CH_3-O)_nH$,

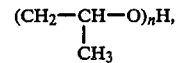

monohydroxylated $C_1$-$C_8$ alkyl, monohydroxylated $C_1$-$C_8$ alkylene, di- or polyhydroxy $C_1$-$C_8$ alkyl, dihydroxy or polyhydroxy $C_1$-$C_8$ alkylene, $C_1$-$C_8$ alkyl, or $C_1$-$C_8$ *l alkylene, n is an integer of from* 1 to about 20, a is 0 or 1, X, when present, is an anionic radical selected from the group consisting of $SO_3$, $PO_3$, $PO_4$, and $COO$, Z, when present, is H or hydrogens or a water soluble cation or cations, Z being chosen to counterbalance the valence of X, X,Z combined may also denote an amine functionality of the formula

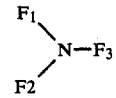

wherein $F_1$, $F_2$ and $F_3$ are idependently selected from H, and $C_1$-$C_5$ alkyl $C_1$-$C_5$ hydroxy-substituted or carboxy-substituted alkyl, the molar ratio of repeat units c:d being from about 30:1 to about 1:20.

In accordance with the method, from 0.1 to 500 parts of the (meth)acrylic acid/allyl ether copolymer are admitted to the desired aqueous system, based upon one million parts of the aqueous system.

PRIOR ART

The water soluble or water dispersible copolymers used in accordance with the invention to control calcium oxalate scale are not new. For instance, U.S. Pat. No. 4,500,693 (Takehara et al) discloses water soluble copolymers having an acrylic acid or methacrylic acid repeat unit which is co-polymerized with certain allyl ether monomers. The polymers disclosed in accordance with Takehara et al are useful calcium carbonate inhibitors and may also be used as pigment dispersants.

U.S. Pat. No. 4,469,615 (Tsuruoka et al) discloses water treatment compositions comprising a water soluble copolymer having, as the components, one repeat unit formed from an addition reaction product of a glycidyl ether of clycidyl ester and an $\alpha$, $\beta$ ethylenically unsaturated carboxylic acid. The co-monomer may comprise any vinyl monomer. The copolymers are reported as being useful as corrosion inhibition agents in water systems.

Japanese Patent Publication No. SHO56-155692, "Method of Collecting Dust" discloses use of acrylic acid/polyethylene glycol monoallylether copolymers which are utilized to treat the recirculating water in an aqueous dust collecting system. In this disclosure, the number of moles of ethoxylation is taught as being from 5 to 100. If the number is less than 5, the scale control and dispersant efficacies are insufficient.

Offenlegungsschrift No. 25 22 647 discloses varied acrylic acid type copolymers which may be utilized to stabilize hardness in water systems.

European Publication No. 0142929 discloses water treatment polymers which are in many cases coextensive with those herein disclosed. The polymers are utilized to inhibit calcium phosphate and calcium phosphonate in aqueous systems. They also function to provide a passivated oxide film along treated metal surfaces when they are used conjointly with a water soluble orthophosphate source.

U.S. Pat. Nos. 4,659,481 (Chen) and 4,732,698 (Chen) disclose the utilization of certain (meth)acrylic acid/allyl ether copolymers that may be utilized to provide the elusive passive oxide film along water system metallurgy when used conjointly with an orthophosphate ion source. Most specifically preferred is utilization of an acrylic acid/2-hydroxypropylsulfonate ether copolymer.

U.S. Pat. Nos. 4,659,482 (Chen) and 4,717.499 (Chen) disclose use of (meth)acrylic acid/allyl ether copolymers to simultaneously inhibit corrosion and calcium carbonate deposition in water systems under elevated pH (i.e., 7.5–9.0) and calcium carbonate supersaturation conditions.

U.S. Pat. No. 4,701,262 (Chen) discloses the utilization of acrylic acid/allylhydroxyalkyl ether copolymers in combination with 2-phosphonobutane 1,2,4-tricarboxylic acid to inhibit calcium sulfate and calcium sulfate and calcium carbonate scale.

U.S. pending application Serial No. 037,484, filed April 13, 1987, now allowed, discloses utilization of acrylic acid/allylhydroxyalkyl ether copolymers to control calcium phosphante scale in water systems.

U.S. Pat. Nos. 4,659,480 (Chen et al) and 4,708,815 (Chen et al) disclose utilization of certain acrylic acid/allyl alkylene phosphite ether copolymers in water treatment systems.

U.S. Pat. No. 4,560,481 (Hollander) discloses utilization of acrylic acid/allylhydroxypropylsulfonate ether copolymers to control iron-based fouling in cooling water system. U.S. Pat. No. 4,671,880 Wisener et al discloses use of such polymers to control alum carryover from clarifiers, etc.

Processes for controlling calcium oxalate scale over a wide pH range are disclosed in U.S. Pat. No. 4,575,425 (Boffardi et al). In accordance with the disclosure, calcium oxalate in aqueous systems is controlled by use of (a) a water soluble phosphate, phosphonate or phosphinate and (b) an anionic water soluble polyelectrolyte. As to the anionic water soluble polyelectrolytes which may be utilized the preferred polyelectrolytes are polymers of unsaturated carboxylic acids or salts thereof. As examples, acrylic acid, methacrylic acid, copolymers of acrylic acid and methacrylic acid, copolymers of (meth)acrylic acid and 2-acrylamido-2-methyl propane sulfonic acid, copolymers of acrylic acid and 2-hydroxypropyl acrylate, and copolymers of methacrylic acid and 2-hydroxypropyl acrylate are mentioned. After reading the '425 disclosure, one skilled in the art would not expect that allyl derived monomers would be effective as calcium oxalate deposit control agents.

Other patents which may be of interest to the present invention include U.S. Pat. No. 4,029,577 (Godlewski et al); 4,303,568 (May et al); 4,324,684 (Geiger et al). Chem Abstracts 99:58708X, "Scale Inhibitors for Cooling Water System", also appears to be of interest as the disclosed scale inhibitors comprise an acrylic or methacrylic acid copolymer wherein the second monomer is formed from a polyalkylene glycol monoallyl ether.

Chem Abstracts 98:203736r, "Additives for Dust Scrubbing Liquor", discloses utilization of a copolymr of polyalkylene glycol monoallyl ether and methacrylic acid.

DETAILED DESCRIPTION OF THE PREFERRED EMBODIMENT

In accordance with the invention, it has been discovered that certain water soluble copolymers, as shown in Formula I hereinafter, are effective in controlling the formation of calcium oxalate deposits in various water systems. The polymers comprise repeat unit scomposed of an $\alpha,\beta$-ethylenically unsaturated compound and allyl alkylene ether based compound. The (meth)acrylic acid/allyl ether polymers useful in accordance with the invention have the structure

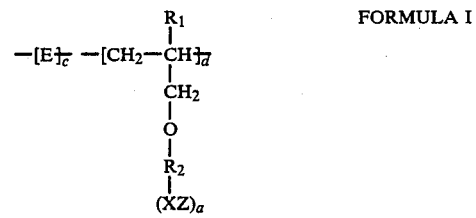

FORMULA I wherein E is the repeat unit remaining after polymerization of an $\alpha,\beta$, ethylenically unsaturated compound, $R_1$ is H or lower ($C_1$–$C_4$) alkyl, $R_2$ is $(CH_2-CH_2-O)_nH$,

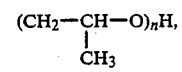

$CH_3$, monohydroxylated $C_1$–$C_8$ alkyl, monohydroxylated $C_1$–$C_8$ alkylene, di- or polyhydroxy $C_1C_8$ alkyl, $C_1$–$C_8$ alkylene, n is an integer of from 1 to about 20, a is 0 or 1, X, when present, is an anionic radical selected from the group consisting of $SO_3$, $PO_3$, $PO_4$, and $CO0$, Z, when present, is H or hydrogens or a water soluble cation or cations, Z being chosen to counterbalance the valence of X, X,Z combined may also denote an amine functionality of the formula

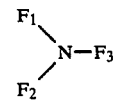

wherein $F_1$, $F_2$, $F_3$ are independently selected from H, and $C_1$–$C_5$ alkyl, $C_1$–$C_5$ hydroxy-substituted or carboxy-substituted alkyl, the molar ratio of repeat units c:d being from about 30:1 to about 1:20.

E in the above formula may, for instance, comprise the repeat unit obtained after polymerization of and $\alpha,\beta$-ethylenically unsaturated monomer, preferably a carboxylic acid, amide form thereof, or lower alkyl ($C_1$–$C_6$) ester or hydroxylated lower alkyl ($C_1$–$C_5$) ester of such carboxylic acid. Exemplary compounds encompassed by E include, but are not restricted to the repeat unit formed by polymerization of acrylic acid, methacrylic acid, acrylamide, maleic acid or anhydride, fumaric acid, itaconic acid, 2-hydroxypropyl acrylate, styrene sulfonic acid, and 2-acrylamido-2-methyl propane-sulfonic acid and the like. Water soluble salt forms of these acids are also within the purview of the invention.

The second repeat unit in Formula I may include, as exemplary repeat units, repeats units formed from monomers such as 1-allyloxy-2-propanol, 1-allyloxypropane 2,3-diol (glyceryl allyl ether), polyethylene glycol allyl ether, polypropyleneglycol allyl ether, 1-allyloxypropane 2-hydroxyl-3-sulfonic acid and water soluble salt forms thereof.

The molar ratio c:d of the repeat unit may fall within the range of 30:1 to 1:20, more desirably within 15:1 to 1:10.

The number average molecular weight of the water soluble copolymers of Formula I is not critical and may fall within the $\overline{Mn}$ range of from about 1,000 to 1,000,000, desirably, 1,000 to 30,000, and most desirably 1,500 to 25,000. The key criterion is that the copolymer be water soluble.

The polymers may be prepared by conventional techniques such as those expressed in U.S. Pat. No. 4,659,481 (Chen) and 4,708,815 (Chen et al), both being of common assignment hereiwth and both being incorporated herein by reference. It is noted that in the case in which XZ in repeat unit (d) is an amine functionality, the monomer can be prepared in accordance with the following mechanism:

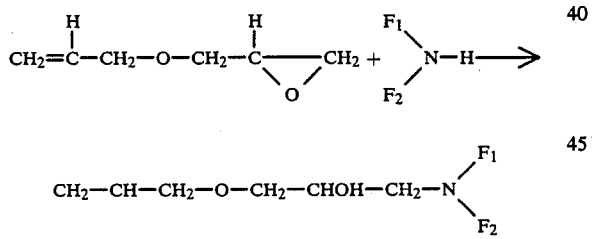

For sake of brevity, suffice it here to state that these conventional techniques include free radical solution, precipitation or emulsion polymerization techniques. Conventional polymerization initiators such as persulfates, peroxides, UV light, etc. may be used. Chain transfer agents such as alcohols (preferably isopropanol), amine or mercapto compounds may be used to regulate the molecular weight of the polymer. The resulting polymer may be isolated by well known techniques including precipitation, etc. If polymerized in water, the polymer may simply be used in its aqueous solution.

The polymers presently preferred for use ar eacrylic acid/2-hydroxypropyl sulfonate ether polymers of the formula:

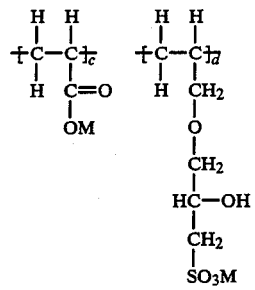

Formula II wherein M is H or a water soluble cation, the molar ratio c:d being about 15:1 to 1:10. The optimal number average molecular weight ($\overline{Mn}$) of the Formula II copolymer is on the order of 1,000 to 30,000.

Superior performacne has also be shown by acrylic acid/1-allyloxy-2-propanol (AOP) copolymers illustrated by the following Formula III:

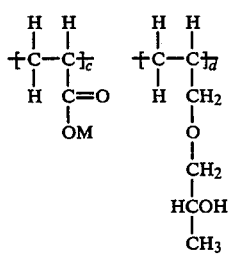

Formula III

M is as defined in Formula II, the molar ratio of c:d is from about 15:1 to 1:10 and the molecular weight Mn of the copolymer is preferably about 1,000-30,000.

Another group of polymers showing particular promise are the acrylic acid/polyethylene glycol allyl ether polymers having the structure

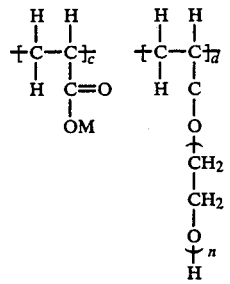

Formula IV wherein n is from 1 to about 20, preferably 1 to 15, c:d is from 15:1 to 1:10, and wherein the preferred $\overline{Mn}$ molecular weight is about 1,000-30,000.

The polymers (Formulae I-IV) should be added to the aqueous system in which calcium oxalate deposit control activity is desired, in an amount effective for the purpose. This amount will vary depending upon the particular system for which treatment is desired and will be influenced by factors such as: hardness, pH, temperature, water quality and the respective concentrations in the water of the potential scale and deposit forming species. For the most part, the polymers will be effective when used at levels of about 0.1-500 parts per million parts of water, and preferably from about 1.0 to 100 parts per million of water contained in the aqueous system to be treated. The polymers may be added directly into the desired water system in a fixed quantity and in the state of an aqueous solution, continuously or intermittently.

The polymers of the present invention are not limited to use in any specific category of water system. For instance, in addition to paper and pulp processing, the polymers may also be effectively utilzied in other water systems wherein calcium oxalate scale control is important.

In an especially significant aspect of the invention, the calcium oxalate scale control agents herein disclosed exhibit the characteristic of being highly calcium tolerant. By this, we mean, that unlike some other known anionic polyelectrolytes, the (meth)acrylic acid-/allyl ether copolymers of the present invention are able to perform their intended calcium oxalate scale control function even in those waters having a high calcium ion content (i.e., greater than about 300-400 ppm as $Ca^{++}$). In contrast, some other anionic polymers selectively react with the high levels of calcium in the system water and are then unavailable to perform their intended scale control function.

The invention will now be further described with reference to a number of specific exmaples which are to be regarded solely as illustrative, and not as restricting the scope of the invention.

EXAMPLES

The following examples deal with the preparation of the copolymers which have proven efficacious in controlling calcium oxalate scale formation.

EXAMPLES 1-6 Preparation of acrylic acid (AA) allyl hydroxypropylsulfonate ether, sodium salt (AHPSE)

These polymers were all prepared in substantial conformity to the procedure given in Examples 1 and 6 of U.S. Pat. No. 4,659,481, with major exceptions being the relative ratios of reactants used and the molecular weights of the resulting polymers. Example 1 of the '481 patent is repeated hereinbelow.

A suitable reaction flask was equipped with a mechanical agitator, a thremometer, a reflux condenser, a nitrogen inlet and two addition inlets for the initiator and monomer solutions. The flask was charged with 200g of deionized water and 26g of isopropanol. The resulting solutionw as then heated to reflux under a nitrogen blanket 72g of acrylic acid (1 mole) and 136g of 1-propane sulfonic acid, 2-hydroxy-3-(2-propenyl oxy) mono sodium salt [AHPSE] (40%, 0.25 mole) were mixed in a separate flask so as to provide a mixed monomer solution. The mixed monomer solution was then transferred to an addition funnel. An initiator solution containing 27.3% of sodium persulfate in deionized water was prepared separately and sparged with nitrogen. The initiator solution (20 ml) was then added to the reaction flask along with the mixed monomer solution over a period of 2 hours. After this addition, the restulting mixture was heated for 2 more hours at 85C and subsequently, 66.5g of the isopropanol/water solution was stripped off. The reaction mixture was then cooled to less than 40C and 60g of 50% caustic solution was then added.

EXAMPLE 7 Preparation of ACrylic Acid (AA)/1-Allyloxy-2-propanol (AOP) Copolymer of about 3/1 mole ratio AA/AOP.

A suitable reaction flask was equipped with a mechanical agitator, a thermometer, a reflux condenser, a nitrogen inlet and two addition inlets for the initiator and monomer solutions. The flask was charged with 220 g of deionized water and 35 g of isopropanol. The resulting solution was then heated to reflux under a nitrogen blanket. In a separate vessel, 43.2g (0.6 mole) of acrylic acid and 23.2g (94% pure, 0.19 mole) of 1-allyloxy-2-propanol were mixed so as to provide a mixed monomer solution. The mixed monomer solution was then transferred to an addition funnel. An initiator solution containing 24.4% of sodium persulfate in deionized water was prepared separately and sparged with nitrogen. The initiator solution (17g) was then added to the reaction flask along with the mixed monomer solution over a period of two hours. After this addition, some additional persulfate solution was added to the reaction mixture for one more hour at 85C and, subsequently, 109.0g of the isopropanol/water solution were stripped off. The reaction mixture was then cooled to lower than 40C and 34g of 50% caustic solution was added.

The structure of the resulting polymer was verified by Carbon 13 NMR. The polymer solution, after being diluted to 24.8% solids with water, had a Brookfield viscosity of 14.7 cps at 25C. It was stable solution with a slightly yellow color. The molecular weight was (Mn) was 4,000 as determined by GPC.

EXAMPLE 8

Utilizing the apparatus and procedure described in Example 7, 43.2g of acrylic acid (0.6 mole) and 12g of AOP (94%, 0.097 mole) were used for copolymerization. The resulting polymer solution, after being diluted to 23.8% solids had a Brookfield viscosity of 15.7 cps (at 25° C.).

EXAMPLE 9

AA/polyethyleneglycol (PEG) Allyl Ether Copolymer

Utilizing both apparatus and procedure similar to that described in Example 6, 120g of deionized water and 24g of polyethyleneglycol allyl ether (with 4 moles of ethylene glycol) were charged to a reaction flask. The solution was then heated to 90C under a nitrogen blanket. 21.6 g of acrlyic acid were then added to the reaction flask along with an initiator solution comprising sodium persulfate over a period of 1 hour. The reaction mixture was heated for 3 more hours and was subsequently cooled to lower than 40C while 16g of 50% caustic solution was added. C13 NMR showed that no residual monomer was present.

The resulting polymer solution, after being diluted to 25% with water, had a Brookfield viscosity of 24 cps (at 25C). The molecular weight (Mn) was 7,500 as determined by GPC.

EXAMPLE 10

AA/PEG Allyl Ether

Utilizing the apparatus and procedure described in Example 6, 21.6g of acrylic acid (0.3 mole) and 48.1g of polyethyleneglycol allyl ether (containing 9.6 moles of ethyleneglycol) were used for copolymerization. The resulting polymer solution, after being diluted to 25.3% had a Brookfield viscosity of 22.6 cps (at 25C). The molecular weight was 5,100 as measured by GPC.

Examples 11-18 were prepared by the similar methods as described above.

Table I hereinbelow presents a summary of the physical properties of the copolymers.

TABLE I
Copolymer Properties

| Copolymer | Composition | Mole Ratio | Viscosity, cps Brookfield 25%, 25° C. | $\overline{M}n$ |
|---|---|---|---|---|
| Example 1 | AA/AHPS | 3:1 | 15.8 | 6,900 |
| Example 2 | AA/AHPS | 3:1 | 14.9 | 5,100 |
| Example 3 | AA/AHPS | 6:1 | 23.0 | 7,500 |
| Example 4 | AA/AHPS | 6:1 | 15.2 | 4,500 |
| Example 5 | AA/AHPS | 6:1 | 13.6 | 2,610 |
| Example 6 | AA/AHPS | 15:1 | 18.8 | 6,800 |
| Example 7 | AA/AOP | 3:1 | 14.7 | 4,000 |
| Example 8 | AA/AOP | 6:1 | 15.7 | 4,000 |
| Example 9 | AA/PEG AE* | 3:1 | 24.0 | 7,500 |
| Example 10 | AA/PEG AE** | 3:1 | 22.6 | 5,100 |
| Example 11 | MAA/PEG AE** | 6:1 | 132.0 (30%) | — |
| Example 12 | MAA/PEG AE* | 6:1 | 122.0 (30%) | — |
| Example 13 | AA/GAE | 3:1 | 18.6 | — |
| Example 14 | AA/GAE | 6:1 | 22.5 | — |
| Example 15 | AA/AMPS | 4.3:1 | 12.7 | — |
| Example 16 | AA/AMPS | 15:1 | 14.4 | 5,200 |
| Example 17 | AA/AHPSE/AMPS | 6:1:1 | 18.0 | 2,980 |
| Example 18 | AA/HPA | 15:1 | 18.8 | 5,500 |

AA = acrylic acid
AHPS = 1-allyloxypropane-2-hydroxypropane-3-sulfonic acid sodium salt
AOP = 1-allyloxy-2-propanol
MAA = methacrylic acid
PEG AE = polyethyleneglycol allyl ether
* @ 9.6 moles of ethyleneglycol
** @ 4 moles of ethyleneglycol
GAE = glyceryl allyl ether
AMPS = 2-acrylamido-2-methylpropane sulfonic acid
HPA = 2-hydroxypropyl acrylate
Mn, number average molecular weight, was measured by the gel permeation chromatography (GPC) method using Toyo Soda G-2000 SW or G-4000 SW column calibrated with polystyrene sulfonate standards in sodium nitrate solution. Molecular weight results from GPC depend on the type of column, condition and standards used.
Examples 15, 16 and 18 are disclosed in U.S. Pat. No. 4,575,425. They are used herein to serve as a basis for comparison.

In addition to tests run with the copolymers reported in Examples 1-18 thereof, comparative tests were also performed using many conventional, well-known, water treatment agents. These are identified in the following "Control Table".

Control Table

| CONTROL | DESCRIPTION |
|---|---|
| A | sodium tripolyphosphate STPP |
| B | sodium hexametaphosphate |
| C | 2-phosphonobutane-1,2,4-tricarboxylic acid |
| D | aminotris(methylene phosphonic acid) = AMP |
| E | sulfonated lignin |
| F | poyacrylic acid |
| G | copolymer of sulfonated styrene maleic anhydride (ARCO Chemical Co.) |
| H | copolymer maleic anhydride/methylvinyl ether |
| I | sulfonated napthalene formaldehyde condensate |
| J | copolymer of sulfonated styrene/maleic anhydride (National Starch Co.) |
| K | styrene/maleic anhydride |

EFFICACY TESTING

Calcium Oxalate Control Tests

The deposit control testing was based on crystal modification. Oxalate, deposit control agent, and calcium were respectively added to a known volume of deionized water preheated to 60° C. The pH of the test solution was checked/adjusted following the addition of the deposit control agent; the pH of the calcium stock solution was preadjusted to the appropriate value prior to addition. The sample was then incubated at 60° C. for one hour. At that time, the percent transmittance of the supernatant solution was measured without disturbing any settled precipitate. The (%) percent transmittance was determined at a wavelength of 415 nanometers.

During incubation unmodified calcium oxalate crystals settled quickly; the solution was clear and yielded a high percent transmittance measurement. Crystals modified by the adsorption of anionic deposit control agents were smaller and more negatively charged and remained suspended for long periods of time; in this case the test solution was cloudy and yielded a lower percent transmittance measurement.

The percent deposit control was calculated from the expression.

$$\%C = \frac{\%T(\text{untreated}) - \%T(\text{treated})}{\%T(\text{untreated})} \times 100$$

Test Conditions: 60° C., 1 hour incubation time 400 ppm Ca(as $Ca^{+2}$), 300 ppm oxlate, 10–100 ppm deposit control agent, pH 7–10 Results are Reported in Tables IIA and IIB.

TABLE IIA
Calcium Oxalate Control Test
(60° C.; 10 ppm active)

| Example | Additive | % Control pH 7 | % Control pH 10 |
|---|---|---|---|
| 1 | AA/AHPSE | 91.8 | 94.3 |
| 2 | AA/AHPSE | 92.8 | 92.1 |
| 3 | AA/AHPSE | 85.8 | 90.6 |
| 4 | AA/AHPSE | 90.9 | 93.0 |
| 5 | AA/AHPSE | 78.6 | 88.7 |
| 6 | AA/AHPSE | 46.4 | 48.4 |
| 7 | AA/AOP | 82.8 | 70.9 |
| 8 | AA/AOP | 70.6 | 71.4 |
| 9 | AA/PEG AE | 75.0 | 77.8 |
| 10 | AA/PEG AE | 80.1 | 79.6 |
| 11 | MAA/PEG AE | 54.9 | 53.8 |
| 12 | MAA/PEG AE | 52.8 | 47.7 |
| 13 | AA/GAE | 35.6 | 30.9 |
| 14 | AA/GAE | 67.7 | 63.0 |
| 15 | AA/AMPS | 90.1 | 92.0 |
| 16 | AA/AMPS | 76.2 | 68.2 |
| 17 | AA/AHPSE/AMPS | 90.9 | 95.4 |
| 18 | AA/HPA | 64.3 | 87.4 |
| A | | 0 | 2.2 |
| B | | 22.8 | 15.5 |
| C | | 5.1 | 2.0 |
| D | | 0 | 0 |
| E | | 5.6 | 3.1 |
| F | | 4.8 | 25.4 |
| G | | 1.0 | 5.3 |
| H | | 0 | 0 |
| I | | 0 | 1.1 |
| J | | 4.6 | 5.2 |
| K | | 7.5 | 3.7 |

A lower temperature test at 25° C. is reported in Table IIB.

TABLE IIB
Calcium Oxalate Control Test
(25° C.; 10 ppm active)

| Example | Additive | % Control pH 7 | % Control pH 10 |
|---|---|---|---|
| 1 | AA/AHPSE | 94.8 | 85.7 |
| 2 | AA/AHPSE | 90.8 | 96.1 |
| 3 | AA/AHPSE | 94.6 | 93.2 |
| 4 | AA/AHPSE | 85.5 | 88.1 |
| 5 | AA/AHPSE | 75.0 | 73.3 |
| 6 | AA/AHPSE | 66.7 | 63.6 |
| 7 | AA/AOP | 84.8 | 81.0 |
| 8 | AA/AOP | 85.0 | 90.4 |
| 9 | AA/PEG AE | 88.9 | 90.5 |
| 10 | AA/PEG AE | 94.4 | 85.0 |
| 11 | MAA/PEG AE | 93.0 | 81.8 |

TABLE IIB-continued

Calcium Oxalate Control Test
(25° C.; 10 ppm active)

| Example | Additive | % Control pH 7 | % Control pH 10 |
|---|---|---|---|
| 12 | MAA/PEG AE | 93.0 | 90.0 |
| 13 | AA/GAE | 92.2 | 81.4 |
| 14 | AA/GAE | 88.3 | 90.3 |
| 15 | AA/AMPS | 85.7 | 84.6 |
| 16 | AA/AMPS | 88.9 | 87.2 |
| 17 | AA/AHPSE/AMPS | 85.7 | 88.6 |
| 18 | AA/HPA | 93.3 | 82.1 |
| A | | 0 | 40.2 |
| B | | 0 | 0 |
| C | | — | — |
| D | | — | — |
| E | | 41.7 | 59.5 |
| F | | 59.4 | 74.8 |
| G | | 92.1 | 83.9 |
| H | | 86.5 | 0 |
| I | | 0 | 22.8 |
| J | | 76.2 | 88.6 |
| K | | 82.9 | 2.2 |

From the results reported in Tables IIA and IIB, it can be seen that the polymers in accordance with the invention are superior to the tested comparative water treatment agents in inhibiting calcium oxalate scale information, especially at elevated temperature which is a more common field condition. Copolymers of Examples 15, 16, and 18 as disclosed in the prior art Boffardi et al patent are also efficacious under these condition. However, they contain either amide or ester linkages which are not as thermally and hydrolytically stable as the copolymers in this invention which contain ether linkages.

The Controls and Examples previously described were also examined at 60-400 ppm calcium and 100 ppm oxalate. The % control in this case was determined by measuring the filtered residual calcium levels since there is insufficient amount of crystal to be observed by light transmittance. With a 25 ppm active of copolymer of Example 3 provided 42.4% and 78.9% control, respectively. Under the identical conditions, duplicate tests with a 25 ppm active of Control B material provided 95% and 45.6% control The inconsistency in this data preclude any conclusive comparisons and the data are deemed to be irrelevant in this testing conditions. In contrast, the results shown in Tables IIA and IIB are reproducible.

CALCIUM TOLERANCE TEST

Calcium tolerance testing was based on the appearance of turbidity or a deposit when a deposit control agent was added to a known concentration of calcium and incubated at 60C for one hour. A deposit control agent was considered intolerant of calcium if its associated test solution was turbid or contained a sediment at the end of the incubation period. Testing results of the polymers in this invention and the comparative material ares shown in Table III.

Test Conditions: Temp.=60° C., 1 hour incubation time, 400 ppm Ca+2 (as Ca+2) 10-100 ppm deposit control agent, pH=7-10.

TABLE III

Calcium Tolerance Test
(60° C.; 100 ppm active)
Final Solution Appearance

| Example | pH 7 | pH 10 |
|---|---|---|
| 1 | C | C |
| 2 | C | C |
| 3 | C | C |
| 4 | C | C |
| 5 | C | C |
| 6 | C | D |
| 7 | C | C |
| 8 | C | C |
| 9 | C | C |
| 10 | C | C |
| 11 | C | C |
| 12 | C | C |
| 13 | C | T |
| 14 | C | T |
| 15 | C | C |
| 16 | C | T |
| 17 | C | C |
| 18 | C | C |
| A | C | D |
| B | C | T,D |
| C | C | D |
| D | D | D |
| E | C | C |
| F | T | D |
| G | T | T |
| H | C | D |
| I | C | C |
| J | C | C |

C = Clear
T = Turbid
D = Deposit

Additional test was also done at 10 ppm active for the copolymers of Examples 6, 13, and 14. At pH 7 and 10, they are all clear.

DISCUSSION OF RESULTS AND OPINION THEREON

As shown in the Tables IIA and IIB, it is clear that the polymers in the instant invention control the growth of calcium oxalate crystals more effectively than many of the conventional deposit controla gents. In particular, the polymers used in accordance with the invention perform much more effectively than the craylic acid homopolymer, the maleic anhydride copolymers, and the sulfonated copolymers. In addition, the data in Table III prove that the turbidity which developed during the deposit control test involving the acrtylic acid/allyl ether polymers, is due to calcium oxalate crystal growth modification, and not simply due to calcium intolerance. In comparison, several of the tested control materials are calcium intolerant. Therefore, the methods herein disclosed solve the problem of controlling clacium oxalate formation especially in aqueous systems in which high calcium and/or oxalate levels preclude the use of more conventional agents.

While this invention has been described with respect to particular embodiments thereof, it is apparent the numerous other forms and modifications of this invention will be obvious to those skilled in the art. The appended claims and this invention generally should be construed to cover all such obvious forms and modifications which are within the true spirit art.

We claim:

1. A method of inhibiting the formation of calcium oxalate scale formation in an aqeous medium hving a pH of at least about 7 comprising adding tos aid aqueous medium an effective amount to inhibit said formation of a water soluble or water dispersible polymer having repeat units represented by the formula

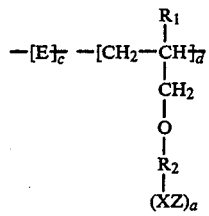

wherein E is the repeat unit remaining after polymerization of an $\alpha,\beta$, ethylenically unsaturated compound, $R_1$ is H or lower ($C_1$-$C_4$) alkyl, $R_2$ is $(CH_2-Ch_2-O)_nH$,

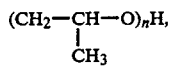

monohydroxylated $C_1$-$C_8$ alkyl, monohydroxylated $C_1$-$C_8$ alkylene, di-or polyhydroxy $C_1$-$C_8$ alkyl, dihydoxy or polyhydroxy $C_1$-$C_8$ alkylene, $C_1$-$C_8$ alkyl, or $C_1$-$C_8$ alkylene, n is an intger of from 1 to about 20, a is 0 or 1, X, is an anionic radical selected from the group consisting of $SO_3$, $PO_3$, $PO_4$, and $CO0$, Z, is H or hydrogens or a water soluble cation or cations, Z being chosen to counterbalance the valence of X, XZ combined also comprises an amine functionality of the formula

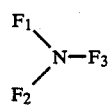

wherein $F_1$, $F_2$, and $F_3$ are independently selected from H and $C_1$-$C_5$ alkyl, $C_1C_5$ hydroxy-substituted or carboyx-substituted alkyl, the molar ratios of repeat units c:d being from about 30:1 to about 1:20.

2. Method as recited in claim 1 wherein said water soluble or water dispersible polymer has a molecular weight ($\overline{Mn}$) of from about 1,000 to 100,000.

3. Method as recited in claim 2 wherein said water soluble or water dispersible polymer has a molecular weight ($\overline{Mn}$) of from about 1,000 to about 30,000.

4. Method as recited in claim 3 wherein said water soluble or water dispersible polymer has a molecular weight ($\overline{Mn}$) of from about 2,500 to about 25,000.

5. Method as recited in claim 1 wherein said molar ratio of repeat units c:d is from 15:1 to 1:10.

6. Method as reciated in claim 1 wherein E is the repeat unit obtained from the polymerization of acrylic or methacrylic acid.

7. Method as recited in claim 1 wherein $R_1$ is H, $R_2$ is 2-hydroxypropyl, a is 1, X-$SO_3$, and Z is a cation or H.

8. Method as recited in claim 1 wherein $R_1$, is H, $R_2$ is 2-hyroxypropyl, a=0.

9. Method as recited in claim 1 wherein $R_1$, is H, $R_2$ is $(CH_2-CH_2-O)_nH$, a =0, n is about 1 to 15.

10. Method as recited in claim 1 wherein $R_1$ is H, $R_2$ is 2,3-dihydroxypropyl, a=0.

11. Method as reciated in claim 1 wherein $R_2$ is

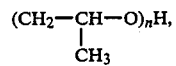

wherein $R_1$ is H and n is bout 1 to 15, a=0.

12. Method as recited in claim 1 wherein said aqueous system comprises a pulp or paper process system.

* * * * *